US008463195B2

(12) United States Patent  
Shellhammer

(10) Patent No.: US 8,463,195 B2
(45) Date of Patent: Jun. 11, 2013

(54) METHODS AND APPARATUS FOR SPECTRUM SENSING OF SIGNAL FEATURES IN A WIRELESS CHANNEL

(75) Inventor: Stephen J. Shellhammer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 823 days.

(21) Appl. No.: 12/618,533

(22) Filed: Nov. 13, 2009

(65) Prior Publication Data

US 2011/0021167 A1 Jan. 27, 2011

Related U.S. Application Data

(60) Provisional application No. 61/227,700, filed on Jul. 22, 2009.

(51) Int. Cl.
 *H04B 17/00* (2006.01)
(52) U.S. Cl.
 USPC ............... 455/67.13; 455/67.11; 455/41.2; 455/507; 455/515; 455/516; 370/445; 370/447; 370/448
(58) Field of Classification Search
 USPC ............ 455/41.1–41.2, 67.11, 67.13, 67.16, 455/561, 562.1, 434, 450, 452.1–452.2, 507–516; 370/329–332, 445–449
 See application file for complete search history.

(56) References Cited

U.S. PATENT DOCUMENTS

| 5,272,446 | A | 12/1993 | Chalmers et al. |
| 5,604,730 | A | 2/1997 | Tiedemann, Jr. |
| 6,014,620 | A | 1/2000 | Handel |
| 6,498,785 | B1 | 12/2002 | Derryberry et al. |
| 6,879,627 | B1 | 4/2005 | Davidson et al. |
| 6,922,405 | B2 * | 7/2005 | Eikelenboom et al. ....... 370/338 |
| 7,010,556 | B1 * | 3/2006 | Marro et al. .................. 708/300 |
| 7,171,165 | B2 | 1/2007 | Azman et al. |
| 7,173,918 | B2 * | 2/2007 | Awater et al. ................. 370/332 |
| 7,218,359 | B2 | 5/2007 | Peng et al. |
| 7,292,833 | B2 * | 11/2007 | Marro et al. .................. 455/296 |
| 7,352,721 | B2 * | 4/2008 | Kim et al. ..................... 370/334 |
| 7,428,270 | B1 | 9/2008 | Dubuc et al. |
| 7,457,295 | B2 | 11/2008 | Saunders et al. |

(Continued)

FOREIGN PATENT DOCUMENTS

| RU | 2252429 | 5/2005 |
| TW | 200605525 | 2/2006 |

(Continued)

OTHER PUBLICATIONS

First Report and Order and Further Notice of Proposed Rulemaking, FCC 06-156, Oct. 18, 2006.

(Continued)

*Primary Examiner* — Tuan A Tran
(74) *Attorney, Agent, or Firm* — Stanton Braden

(57) ABSTRACT

Methods and apparatus for sensing features of a signal in a wireless communication system are disclosed. The disclosed methods and apparatus sense signal features by determining a number of spectral density estimates, where each estimate is derived based on reception of the signal by a respective antenna in a system with multiple sensing antennas. The spectral density estimates are then combined, and the signal features are sensed based on the combination of the spectral density estimates.

36 Claims, 6 Drawing Sheets

U.S. PATENT DOCUMENTS

| | | | |
|---|---|---|---|
| 7,480,278 B2* | 1/2009 | Pedersen et al. | 370/335 |
| 7,480,516 B1 | 1/2009 | Chen et al. | |
| 7,574,230 B1 | 8/2009 | Oh et al. | |
| 7,609,613 B2* | 10/2009 | Aghvami et al. | 370/208 |
| 7,647,065 B2 | 1/2010 | Au et al. | |
| 7,668,561 B2 | 2/2010 | Au et al. | |
| 7,684,320 B1 | 3/2010 | Nucci | |
| 8,027,690 B2 | 9/2011 | Shellhammer | |
| 8,031,807 B2 | 10/2011 | Shellhammer | |
| 2004/0023918 A1 | 2/2004 | Monia et al. | |
| 2004/0242158 A1 | 12/2004 | Fattouch et al. | |
| 2005/0152313 A1* | 7/2005 | Cave et al. | 370/333 |
| 2005/0271016 A1* | 12/2005 | Kim et al. | 370/332 |
| 2005/0286402 A1 | 12/2005 | Byun et al. | |
| 2006/0067354 A1 | 3/2006 | Waltho et al. | |
| 2007/0041460 A1* | 2/2007 | Olesen et al. | 375/260 |
| 2007/0207730 A1* | 9/2007 | Nguyen et al. | 455/39 |
| 2008/0285686 A1* | 11/2008 | Beaulieu et al. | 375/329 |
| 2009/0131047 A1 | 5/2009 | Amerga et al. | |
| 2010/0075704 A1 | 3/2010 | McHenry et al. | |
| 2010/0104037 A1* | 4/2010 | Jongren | 375/260 |
| 2010/0296591 A1* | 11/2010 | Xu et al. | 375/259 |

FOREIGN PATENT DOCUMENTS

| | | |
|---|---|---|
| TW | 200830749 | 7/2008 |
| WO | 9848294 | 10/1998 |
| WO | 2006009713 A1 | 1/2006 |
| WO | 2008061044 | 5/2008 |

OTHER PUBLICATIONS

C. R. Stevenson, et al., Functional Requirements for the 802.22 WRAN Standards, IEEE 802.22-04/0004r46, Sep. 2005.

Chris Clanton et al., Wireless Microphone Signal Simulation Method, IEEE 802.22-07/124r0, Mar. 2007.

S. . Kay and S. L. Marple, Jr., "Spectral Analysis: A Modern Perspective," Proc. IEEE vol. 69, pp. 1380-1419, Nov. 1981.

H. W. Sorenson, Parameter Estimation: Principles and Problems, 1980, pp. 33-40, Marcel Dekker Inc., New York.

Cabric D., et al., "Implementation Issues in Spectrum Sensing for Cognitive Radios", Signals, Systems and Computers, 2004.Conference Record of the Thirty-Eighth Asilomar Conference on Pacific Grove, CA, USA Nov. 7-10, 2004, Piscataway, NJ, USA, IEEE, vol. 1, Nov. 7, 2004, pp. 772-776, XP010781056,DOI: DOI : 10.1109/ACSSC. 2004.1399240 ISBN: 978-0-7803-8622-8.

Chang S.Y., "Analysis of Proposed Sensing Schemes", Mar. 6, 2006, XP002557133 Retrieved from the Internet: URL:http://www.ieee802.org/22/Meeting_documents/2006_Mar/22-06-0005-05-0000_ETRI-FT-I2R- Motorola-Philips-Samsung-Thomson_Proposal.ppt> [retrieved on Nov. 23, 2009] p. 54-p. 63.

Guanbo Zheng et al: "Enhanced Energy Detector for IEEE 802.22 WRAN Systems Using Maximal-to-Mean Power Ratio" Wireless Communication Systems, 2007. ISWCS 2007. 4th International Symposium on, IEEE, Piscataway, NJ, USA, Oct. 1, 2007, pp. 370-374, XP031166793 ISBN: 978-1-4244-0978-5 paragraphs I. & III.

International Search Report and Written Opinion—PCT/US2010/042816—ISA/EPO—Apr. 26, 2011.

Pearlstein, U.S. Appl. No. 60/808,554, filed May 26, 2006, p. 1-24.

Shellhammer, S.J.: "Spectrum sensing in IEEE802.22" First Workshop on Cognitive Info. Process. (CIP 2008) Jun. 9, 2008, XP002557132 Retrieved from the Internet: URL:http://www.eurasip.org/Proceedings/Ext/CIP2008/papers/1569094657.pdf> [retrieved on Nov. 23, 2009] paragraphs [06.4] - [06.6].

Welch, P.; "The Use of Fast Fourier Transform for the Estimation of Power Spectra: A Method Based on Time Aver. Aging Over Short, Modified Periodograms," Audio and Electroacoustics, IEEE Transactions on; vol. 15 , Issue: 2; Digital Object Identifier: 0.1109/TAU.1967.1161901; Publication Year: 1967 , pp. 70-73.

Wikipedia, Definition for "Heterodyne" Last updated Aug. 28, 2011, retrieved from http://ja.wikipedia.org/wiki/%E3%83%98%E3%83%86%E3%83%AD%E3%83%80%E3%82%A4%E3%83%B3.

* cited by examiner

METHODS AND APPARATUS FOR SPECTRUM SENSING OF SIGNAL FEATURES IN A WIRELESS CHANNEL

CLAIM OF PRIORITY UNDER 35 U.S.C. §119

The present Application for Patent claims priority to Provisional Application No. 61/227,700 entitled "Methods and Apparatus for Spectrum Sensing of Signal Features in a Wireless Channel" filed Jul. 22, 2009, and assigned to the assignee hereof and hereby expressly incorporated by reference herein.

REFERENCE TO CO-PENDING APPLICATIONS FOR PATENT

The present application for patent is related to the following co-pending U.S. patent applications:

"Systems and Methods for Detecting the Presence of a Transmission Signal in a Wireless Channel" having U.S. application Ser. No. 11/935,911, filed Nov. 6, 2007, assigned to the assignee hereof, and expressly incorporated herein by reference.

"Methods and Apparatus for Sensing the Presence of a Transmission Signal in a Wireless Channel" having U.S. application Ser. No. 12/186,500, filed Aug. 5, 2008, assigned to the assignee hereof, and expressly incorporated herein by reference.

BACKGROUND

1. Field

The present disclosure relates generally to methods and apparatus for spectrum sensing of signal features in a wireless channel, and more specifically to spectrum sensing of narrowband signal features using spatial diversity.

2. Background

Cognitive Radio technology, such as that employed in IEEE 802.22 Wireless Regional Area Networks (WRANs), offers the opportunity to utilize spectrum that is licensed to primary users. This unused spectrum is often referred to as "white space" spectrum. One of the primary methods of identifying white space spectrum is using spectrum sensing technology. A spectrum sensing observes the spectrum for a period of time and then determines if the spectrum is occupied by a primary user or is available for use by the cognitive radio network. A spectrum sensor must sense signals that are weaker than the noise power level. Since the signal power is so low one cannot typically decode the signal and hence must sense for signal features.

In the television band, where cognitive radio technology is likely to be first permitted, there are three primary signal types that need to be sensed: digital TV, analog TV and wireless microphones. In the US the DTV standard is ATSC and the analog TV standard is NTSC. Sensing of ATSC, NTSC and wireless microphones often comes down to sensing narrowband signal features. In ATSC one of the best signal features is the sinusoidal pilot tone. In NTSC two of the best features are the audio and video pilots. So for ATSC and NTSC, which are both 6 MHz wide, the features used in sensing are often quite narrowband. A wireless microphone has a typical bandwidth of less than 100 kHz, so it is a relatively narrowband signal.

Sensing of narrowband signal features, however, is susceptible to Rayleigh fading. Rayleigh fading causes narrowband signals to fade as much as 20 dB or more, which makes them difficult to sense. Also, the sensing performance improves slowly with increasing signal-to-noise ratio (SNR) in a Rayleigh fading channel, unlike the situation in a non-fading channel where sensing performance improves much quicker with increasing SNR.

Additionally, previous sensing techniques have utilized only a single sensing antenna, such as sensing ATSC or wireless microphones with a single sensing antenna. These known sensing techniques require estimation of the power spectrum over a portion of the channel bandwidth and, hence, suffer from the effects of Rayleigh fading. Accordingly, it would be desirable to perform spectrum sensing of narrowband features in a wireless channel with less susceptibility to Rayleigh fading in order to increase sensing performance.

SUMMARY

According to an aspect, a method for sensing features of a signal in a wireless communication system is disclosed. The method includes determining a plurality of spectral density estimates, where each estimate of the plurality is derived based on reception of the signal by a respective antenna of a plurality of antennas. The method further includes combining the plurality of spectral density estimates, and sensing the signal features based on the combination of the plurality of spectral density estimates.

According to another aspect, an apparatus operable for sensing features of a signal in a wireless communication system is disclosed. The apparatus includes a memory storing instructions executable by a processor, and at least one processor configured to execute the instructions stored in the memory. The instructions cause the processor to determine a plurality of spectral density estimates, where each estimate of the plurality is derived based on reception of the signal by a respective antenna of a plurality of antennas. Furthermore, the instructions cause the processor to combine the plurality of spectral density estimates, and sense the signal features based on the combination of the plurality of spectral density estimates.

In yet another aspect, an apparatus operable for sensing features of a signal in a wireless communication system is taught. The apparatus includes means for determining a plurality of spectral density estimates, each estimate of the plurality being derived based on reception of the signal by a respective antenna of a plurality of antennas. Additionally, the apparatus includes means for combining the plurality of spectral density estimates, and means for sensing the signal features based on the combination of the plurality of spectral density estimates.

According to still one further aspect, a computer program product comprising: computer-readable medium is disclosed. The medium includes code for causing a computer to determine a plurality of spectral density estimates in a wireless device, where each estimate of the plurality is derived based on reception of the signal by a respective antenna of a plurality of antennas. The medium also includes code for causing a computer to combine the plurality of spectral density estimates, and code for causing a computer to sense the signal features based on the combination of the plurality of spectral density estimates.

DETAILED DESCRIPTION

In accordance with the present disclosure, methods and apparatus for detecting the presence of a particular transmission signal in a wireless channel using multiple antennas (i.e., spatial diversity) in a manner that is less susceptible to Rayleigh fading and other time diversity fading are disclosed that take advantage of specific spectral characteristics in the transmission signal to improve the detection accuracy. This is useful since the fading on different antennas tends to be different, so when there is a deep fade on one antenna it is unlikely that there will be a deep fade on another antenna. In particular, the disclosed methods and apparatus involve combining signals from multiple sensing antennas to obtain an estimate of the power spectrum for use in sensing narrowband signal features. It is noted that the use of multiple antennas to receive a single signal is referred to as "spatial diversity."

The techniques described herein may be used for various wireless communication networks such as IEEE 802.22 Wireless Regional Area Networks (WRANs), IEEE 802.11 wireless local area networks (WLANs) or other Cognitive Radio technologies. Additionally, it is contemplated that the presently disclosed methods and apparatus could be applicable to other radio technologies should sensing of narrowband signal features be desirable, including technologies such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Ultra Mobile Bandwidth (UMB), Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Figure 1:
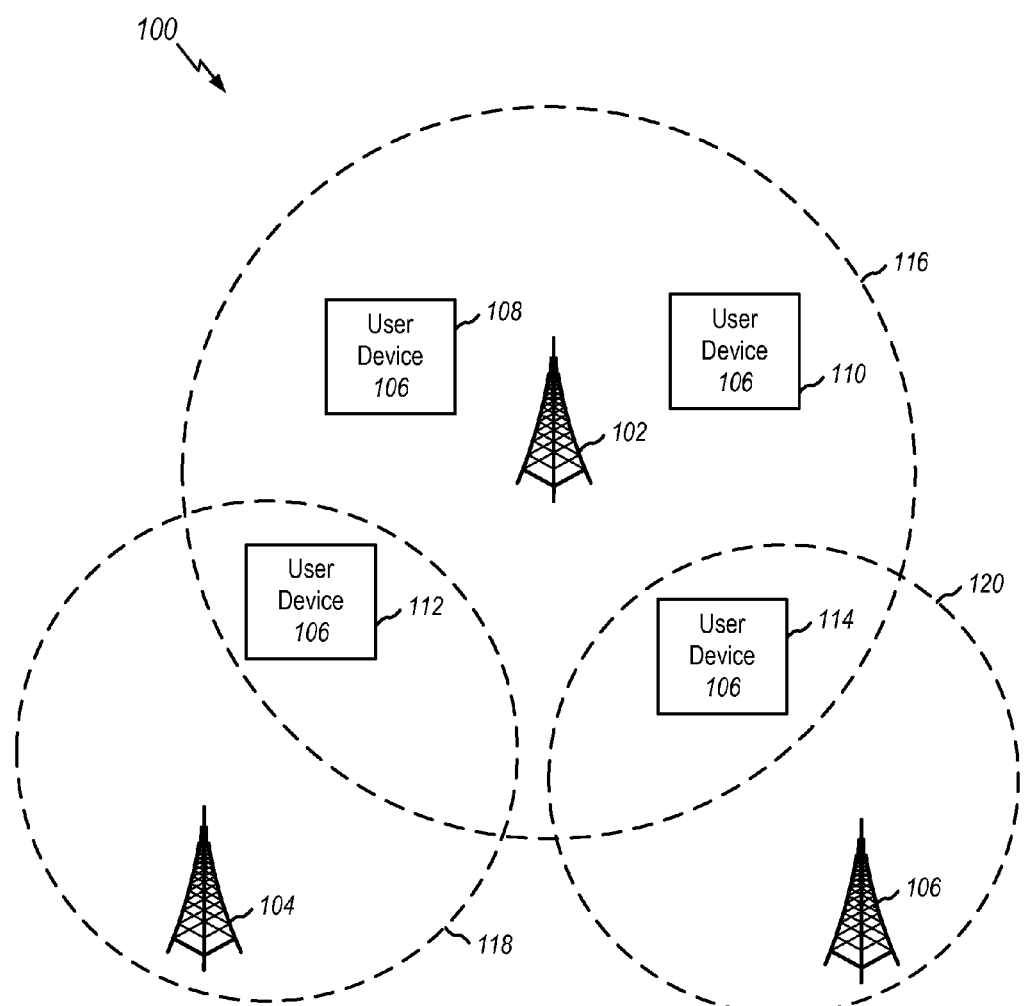
FIG. 1 is a communication network in which the presently disclosed methods and apparatus may be employed.

FIG. 1 illustrates a communication network 100 in which the presently disclosed methods and apparatus may be employed. The network 100 includes a plurality of base stations 102, 104, 106 and a plurality of user devices 108, 110, 112, 114. The user devices 108, 110, 112, 114 may be cognitive radio devices, wireless devices, mobile stations, or other similar devices. The network 100 also includes a plurality of service areas 116, 118 120, which may be effected by the base stations 102, 104, 106, respectively. A first service area 116 includes a first base station 102 and the plurality of user devices 108, 110. The first service area 116 may be overlapped with one or more other service areas, such as illustrated second service area 118, and third service area 120, as examples. As shown, some user devices may be located in a service area that is overlapped by a different service area.

The plurality of base stations 110, 112, 114, 116, 118 may provide service to the user devices located in their respective service area. For example, a first base station 102 may provide services to and perform communications with the user devices located in the first service area 116 (e.g., 108, 110, 112, 114). Each of the plurality of user devices 108, 110, 112, 114 may scan the band of frequencies utilized by one or more base stations 102, 104, 106 as well as the frequencies used by other user devices. A user device that is located in an overlap area between two service areas may scan the frequency band utilized by each base station providing service in the overlap area. Each of the user devices may also be configured to sense whether a channel is occupied by a licensed transmission. For example, each user device may sense whether the RF spectrum is currently occupied by a licensed ATSC digital television transmissions, NTSC analog television transmissions, or wireless microphone transmissions. As discussed above, unoccupied channels may be used for unlicensed wireless network operations by user devices (e.g., user devices 108, 110, 112, and 114). In particular, the user devices may comprise devices such as cognitive radio devices.

Figure 2:
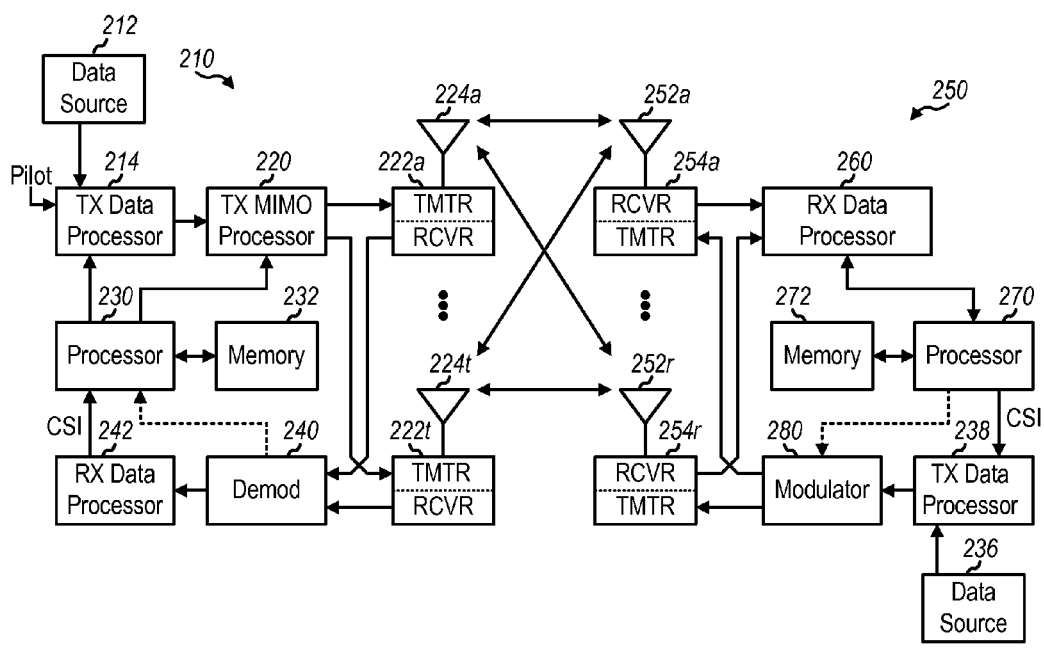
FIG. 2 is a block diagram of an example of a communication system employing multiple antenna technology.

FIG. 2 is a block diagram of an example of a communication system 200 employing multiple antenna technology. In particular, FIG. 2 shows a multiple input multiple output (MIMO) system having a transmitter system 210 and a receiver system 250 to provide spatial diversity. In an aspect, each data stream is transmitted over a respective transmit antenna 224. TX data processor 214 formats, codes, and interleaves the traffic data for each data stream based on a particular coding scheme selected for that data stream to provide coded data.

The coded data for each data stream may be multiplexed with pilot data using known techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signal(s) are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

At least one RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

The present apparatus and methods may also utilize a MIMO type arrangement as shown in FIG. 2 for narrowband feature sensing, which may utilize processing, such as 254 or 260 to only sense the particular narrowband features with spatial diversity. In another aspect, a Single-input, multiple-output (SIMO) like arrangement (e.g., only one transmit antenna 224) for narrowband feature sensing may be employed where a single signal is transmitted by a single antenna from a device (e.g., a base station) and multiple sensing antennas at a user device or sensing device are used to effect spatial diversity for sensing narrowband features of the single signal.

It is noted here that traditional spatial diversity combining techniques typically involve combining signals from multiple antennas in the time domain. These traditional diversity combining techniques include maximal ratio combining and equal power combining. Both of these techniques are time-domain combining techniques requiring signal synchronization. With these techniques, the signals from the multiple antennas must be synchronized so the signals can be combined in-phase. This may be done when a receiver is decoding a signal because it is done at a signal-to-noise (SNR) level at which synchronization of the signal can be performed. However, in spectrum sensing the SNR can be as low as −20 dB, or lower. In that case, it is not possible to synchronize to the signal.

Many spectrum sensing techniques utilize estimation of the power spectral density in a spectral region that contains a narrowband signal feature. Examples of such sensing techniques are disclosed in the applications mentioned above and incorporated by reference herein. The presently disclosed apparatus and methods also utilize power spectral density (PSD) estimation, such as those disclosed in the referenced applications. For example, from 072156 a periodogram generator may be used and configured to determine or calculate a discrete version of the average power spectral estimate or Periodogram (e.g., $$P_{PER}(\omega) = \frac{1}{M}\left|\sum_{m=0}^{M-1} x(m)\exp(-j\omega m)\right|^2 )$$

where $P_{PER}$ is the power spectral density estimate or Periodogram, M is the number of intervals or FFTs calculated, and x(m) is power spectral density estimate determined for each respective m-th interval. Calculating $P_{PER}$ involves taking M number of FFTs, one for each m-th interval, and then determining the absolute value of the FFT results and averaging those absolute values over all M intervals.

It is noted that a baseband signal for an m-th sensing interval may be given by $s_m[n]$ for an n-th sample where n=0, 1, ... N−1. Accordingly, the discrete FFT of the baseband signal for the m-th sensing interval is then given by $X_m[k]$ for k=0, 1, ... N−1. Thus, the discrete version of the average power spectral estimate X[k] over M sensing intervals is given by the equation $$X[k] = \frac{1}{M}\left|\sum_{m=0}^{M-1} X_m[k]\right|^2$$

for k=0, 1, ... N−1. Thus, the sensing may be performed in Frequency Domain using PSD estimations.

For each of a plurality of antennas (e.g., an M number of antennas—not to be confused with M above for FFT intervals), the present application proposes digital sampling of the received signal that spans a portion of the spectrum that contains a narrowband signal feature (e.g. pilot signal) to be sensed. Accordingly, for each of these M signals the power spectral density is estimated over the bandwidth of the signal. This bandwidth is typically a narrow bandwidth that includes the narrowband signal feature but not the entire signal bandwidth. For example, for an ATSC signal which has a 6 MHz bandwidth, the signal that is captured is a filtered version of the total signal, so that its bandwidth is only 20 to 50 kHz. For each of the signals there are N sample points in the power spectral density estimate. Accordingly, a set $S_m(k)$ of M number of power spectral density estimates of the signal received by the M antennas can be defined as:

$$S_m(k) \text{ for } 0 \leq k \leq (N-1) \text{ and } 1 \leq m \leq M \qquad (1)$$

where m is the set number of the particular antenna of the M number of antennas and k is the sample number from among the N sample points.

Given that one or more of the signals in set $S_m(k)$ may be faded significantly in the frequency band of interest, the present application proposes combining the PSD estimates in set $S_m(k)$ so as to obtain a superior PSD estimate that can improve spectrum sensing reliability. The concept relies on the principle that the probability of all the signals fading is much lower than the probability of just one of the signals fading.

In one aspect, a combining technique may consist of averaging the M power spectral density estimates according to the following equation:

$$S(k) = \frac{1}{M}\sum_{m=1}^{M} S_m(k) \text{ for } 0 \leq k \leq (N-1) \qquad (2)$$

In the above estimate S(k), the signal as received by those antennas that are faded less tend to dominate the summation. This naturally emphasizes the signals of interest.

In an alternative PSD combining technique, the M number of PSD estimates may be combined by selecting the point-wise maximum for each index value. That is, for each value of index k, the largest PSD estimate is selected for that index k from among the M estimates at that index. Accordingly, this selection may be represented as follows:

$$S(k) = \max_m(S_m(k)) \text{ for } 0 \leq k \leq (N-1). \qquad (3)$$

In an aspect, the combined PSD estimates, whether combined by averaging (equation (2)) or finding the point-wise maxima (equation (3)), may then further be processed to generate a test statistic. There are multiple different test statistics that can be used. According to one example, the test statistic may be the largest value of the PSD estimate, quantified as follows:

$$T = \max_{k}(S(k)) \quad (4)$$

where T represents the test statistic and max(S(k)) is the maximum value of PSD estimates S(k).

According to an alternative example, a normalized test statistic may be used for a test statistic. In the example of equation (4) above, selection of the largest value of the PSD estimate is not normalized relative to the thermal noise level. Accordingly, in a normalized test statistic given the combined PSD estimate S(k) from either equations (2) or (3) a strongest PSD component p may be found as follows:

$$p = \max_{k}(S(k)). \quad (5)$$

The value p is next normalized. It is contemplated that there are several methods of normalizing p to obtain the test statistic. One example includes calculating a mean $m_1$ of the combined PSD estimate S(k) according to the following equation:

$$m_1 = \frac{1}{N}\sum_{k=0}^{N-1} S(k). \quad (6)$$

In another exemplary method of normalizing p, a median of the PSD samples may be used. In particular, the median of the combined PSD estimate S(k) may be determined according to the following relationship:

$$m_1 = \text{median}(S(k)) \quad (7)$$

where the median value $m_1$ is that value where half of the S(k) are larger than the median value and half of the S(k) are smaller than the median value.

Yet another exemplary method of normalizing p involves first eliminating the values of S(k) near the strongest value p as For example, if $k_1$ is the index of the strongest value p (i.e., $S(k_1)=p$), a window w comprised of a predetermined number of k values can be defined around $k_1$ in which terms in S(k) are zeroed out. After zeroing out the terms in S(k), terms left over in S(k) can be defined as:

$$S_w(k) = \begin{cases} 0 & \text{if } |k - k_1| \le w \\ S(k) & \text{otherwise} \end{cases} \quad (8)$$

Using this new PSD with all elements within the window around $k_1$ set to zero a normalizing factor $m_2$ is set as follows:

$$m_2 = \frac{1}{N - 2w + 1}\sum_{k=0}^{N-1} S_w(k). \quad (9)$$

Normalizing factor affords an estimate of the signal outside the window around the maximum value $k_1$. Thus, if the signal feature being sensed for is an ATSC pilot, for example, then this normalizing factor provides a good estimate of the flat PSD around the pilot. When sensing at very low SNR, the PSD around the pilot is just the noise floor. Thus, at low SNR the method is normalizing by the noise. This also works at higher SNR. An additional benefit to using normalization is that no additional calibration is needed when an automatic gain control (AGC) circuit is used.

The strongest PSD value (p) is normalized by one of the previously described normalizing factors (m) to generate the test statistic T, defined as follows:

$$T = \frac{p}{m}. \quad (10)$$

After the test statistic has been generated according to any of the methods above, it is then compared to a predetermined threshold γ. If the test statistic T is larger than the threshold γ (T>γ) then the signal feature is present. If not, the signal feature is not present. In an aspect, the predetermined threshold value is selected to meet the target false alarm rate.

According to another aspect, a further check may be made when sensing for certain spectral features is a frequency check that may be used to modify the test statistic T. The frequency of the ATSC pilot and the NTSC audio and video pilots are transmitted at known accurate frequencies. The sensing receiver will have some frequency offset due to an imperfect local oscillator (LO), so allowance should be made for this frequency offset. Accordingly, let Δf be the total frequency error that is possible due to the combination of any errors in the transmitter (e.g., transmitter 102) and local oscillators in a receiver (e.g. User devices 106). Also let $f_p$ be the expected frequency of the narrowband feature (e.g. pilot signal), and $f_0$ be the frequency of the largest component (p) of the PSD (see e.g., equation (5) above). This check can be quantitatively expressed as follows:

$$T = \begin{cases} T & |f_p - f_0| \le \Delta f \\ T_0 & \text{otherwise.} \end{cases} \quad (11)$$

As may be deduced from the above equation, if the frequency error, as determined by the absolute value of the difference between the expected frequency and the frequency of the largest component, is less than Δf, then the test statistic is unchanged (i.e., the statistic remains equal to T as determined by the example of equation (4) or a normalized test statistic as determined, in part, by either equations (6) or (8)). On the other hand, if the frequency error is larger than Δf, the test statistic T may be modified to a value less than the predetermined threshold. In other words, the test statistic value of T is forced to a value ($T_0$), which is defined to be less than the predetermined threshold γ. This forced value ensures that the sensing algorithm will return a decision that the narrowband feature of interest is not present, even if the original value of T was larger than the threshold. This is done because frequency errors greater than Δf may yield false positives, so a conservative approach is taken to force a result of "not present" for the narrowband feature.

Figure 3:
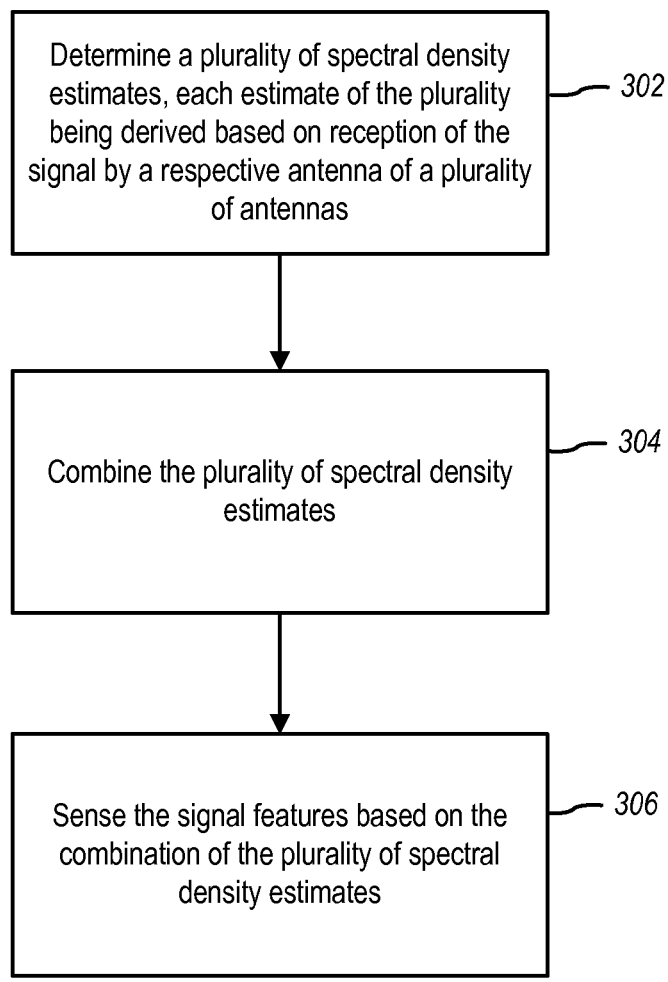
FIG. 3 illustrates a flow diagram of a method for sensing a signal feature in wireless communication system.

FIG. 3 illustrates a flow diagram of a method for sensing a signal feature in wireless communication system. Method 300 includes determining a plurality of spectral density estimates, each estimate of the plurality being derived based on reception of the signal by a respective antenna of a plurality of antennas as shown in block 302. As an example, the processes of block 302 may include determining the set $S_m(k)$ of M number of power spectral density estimates of the signal received by the M antennas as explained above in connection with equation (1).

Flow proceeds from block 302 to block 304 where the plurality of spectral density estimates are combined. According to an aspect, the plurality of spectral density estimates may be combined using equation (2) as described above. In another aspect, the process of block 304 may includes combining point-wise maxima as described above with respect to equation (3).

Finally, method 300 includes block 306 where the signal features are sensed based on the combination of the plurality of spectral density estimates. The process of block 306, in sensing the signal features, may include determining that narrowband signal features of interest are present, thus indicating a wireless device utilizing the particular spectrum (e.g., ATSC, NTSC, or wireless microphones). Furthermore, the sensing and/or determining of block 306 may include generation of a test statistic according to any of the equations discussed above, as well as comparison of the statistic with a predetermined threshold such as $\gamma$ in order to determine whether or not the narrowband signal features are present. In still a further aspect, block 306 may also include the frequency check described above in connection with relationship (11).

Figure 4:
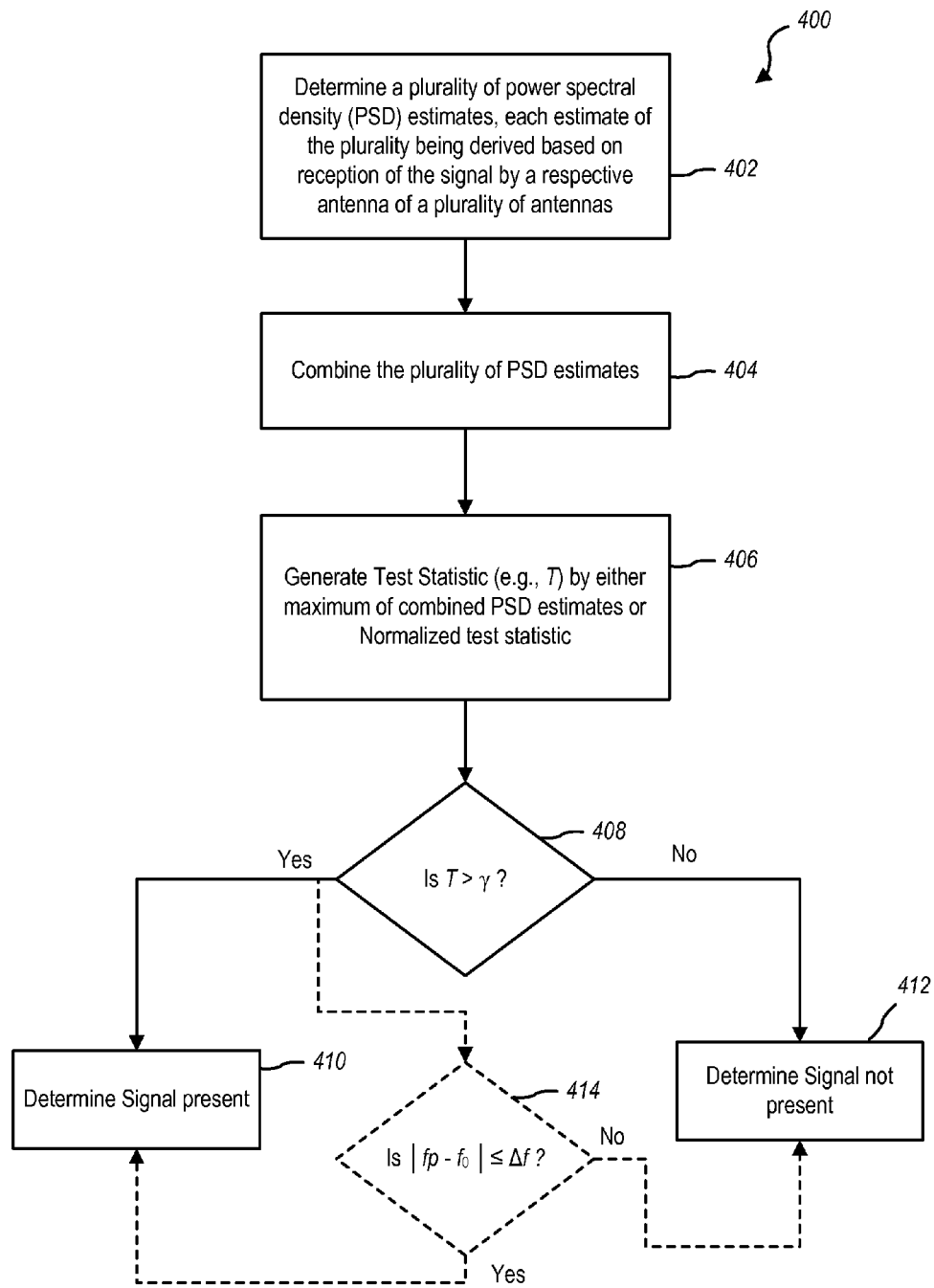
FIG. 4 illustrates a flow diagram of another method for sensing a signal feature in wireless communication system.

FIG. 4 illustrates a flow diagram of another method 400 for sensing a narrowband signal feature in wireless communication system. The method includes a block 402 wherein a plurality of power spectral density (PSD) estimates are determined, each estimate of the plurality being derived based on reception of the signal by a respective antenna of a plurality of antennas. After block 402, flow proceeds to block 404 where the plurality of PSD estimates are combined according to any of the various methods for combining disclosed herein, or any other suitable method for combining spectral density estimates to achieve an accurate estimate of PSDs across M multiple antennas.

Block 406 next effects the generation of a Test Statistic (e.g., T) by either maximum of combined PSD estimates or Normalized test statistic, as disclosed previously herein, or any other suitable method for finding a test statistic. From block 406, flow of method 400 proceeds to decision block 408. Here the test statistic is compared to a predetermined threshold (e.g., $\gamma$) selected to meet a desired target false alarm rate. If the test statistic derived from the combined PSD determined in block 404 is greater than the threshold, this indicates that it is likely the narrowband feature is present (i.e., the presence of the signal). Accordingly, on a "Yes" determination, flow proceeds to block 410 to indicate the determination of the presence of the signal and the process 400 ends. If the comparison in block 408 indicates that the test statistic is below the threshold, then it is likely that the signal feature is not present and flow proceeds to block 412 to indicate that the signal is not present.

In an alternative, method 400 may include a further frequency check to eliminate those cases where a false positive may result if the frequency error is greater that a total possible frequency error. This alternative is illustrated in FIG. 4 by decision block 414. Thus, if block 408 yields a "Yes" condition, flow would proceed to block 414 for the further determination whether the absolute value of the difference between the expected frequency of the narrowband features (e.g., the known frequency of a pilot signal in ATSC) and the frequency $f_0$ of the largest component p of the combined PSD is less than or equal to the total frequency error possible. It is noted here that the largest component p may be determined anytime during or after the determination of the combined PSD in block 404).

If the difference is less than the total frequency error possible, the determination of the presence of the signal stands, and flow proceeds to block 410. On the other hand, if the frequency error is greater than the total frequency error possible (or considered acceptable), then flow proceeds to block 412, even though the value of the test statistic was greater than the predetermined threshold as determined in block 408.

Figure 5:
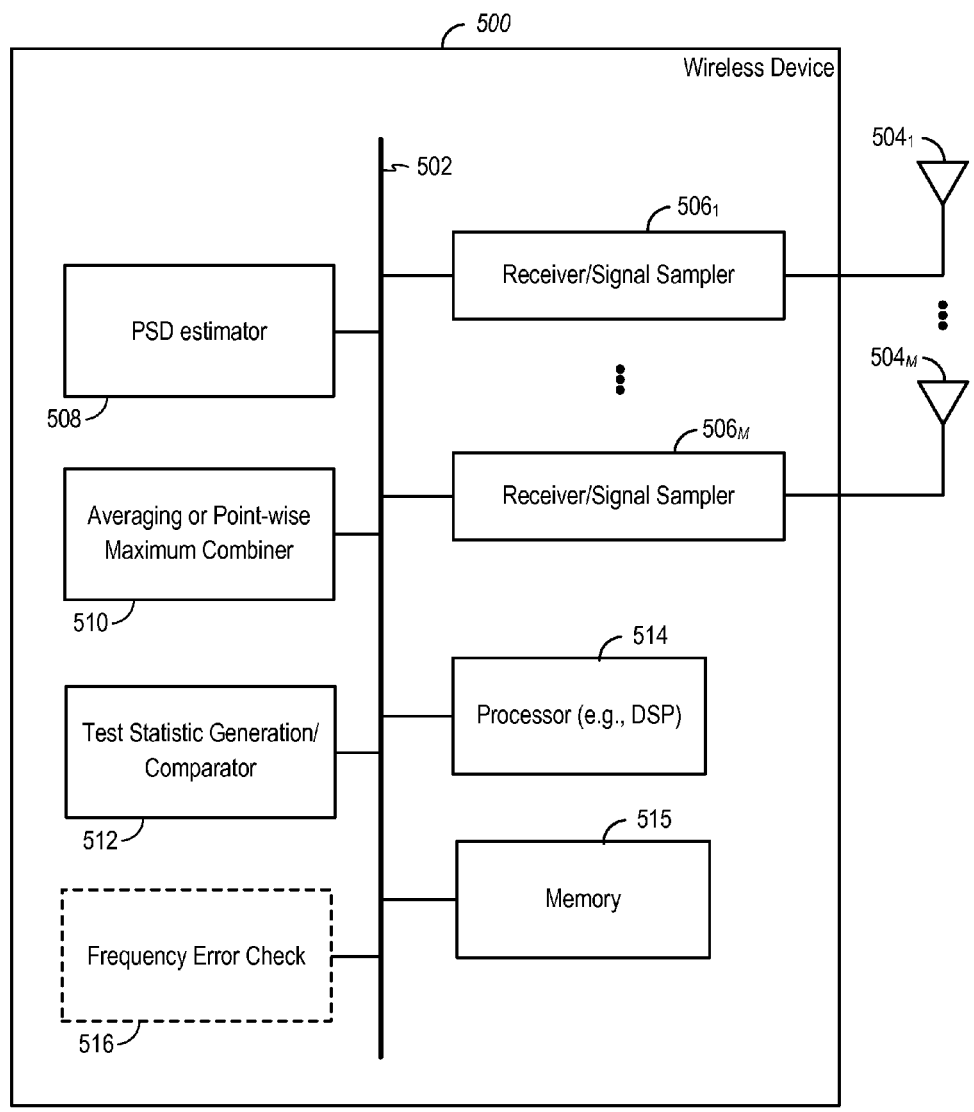
FIG. 5 illustrates an exemplary wireless device that may be used in the system of FIG. 1, for example.

FIG. 5 illustrates an exemplary wireless device 500 that may be used in the system of FIG. 1, for example. It is noted that device 500 may be a receiver portion of a wireless device, which could be a user device, such as 108, 110, 112, and 114 in FIG. 1, in receiver portions of the base stations 102, 104, 106 as well, or even simply a testing device (not shown herein). Device 500 includes a number of various functional modules for effecting respective functions for spectrum sensing of narrowband features (e.g., ATSC, NTSC, wireless microphones, or other licensed wireless transmissions) using spatial diversity. The various modules are shown communicatively coupled with a central data bus 502, or similar device for communicatively linking the several modules together.

User device 500 includes a plurality of antennas 504 with corresponding RF receiver circuitry and digital sampling circuitry 506 to provide samples of the signal received by the respective antennas 504. The digital samples are communicated via bus 502 to a PSD generator 508, which is configured to generate PSDs for each antenna.

Device 500 also includes an averaging or point-wise maximum combiner 510 configured to combine the PSDs determined by generator 508 according to the methods disclosed previously. The combined PSD resultant from combiner 510 is then used by a test statistic generator 512 to compute a test statistic according to either the maximum PSD (see e.g., equation (4) above), or a normalized strongest PSD component (See e.g., one or more of equations (5) through (9) above).

Generator 512 may also be configured to compare the generated test statistic to the predetermined threshold $\gamma$ and thereby make the determination whether the narrowband signal features are present or not. Alternatively, device 500 may include at least one processor 514 (e.g., a DSP) to perform any of the calculations or comparisons effected by any of blocks 508, 510, and 512. A memory 515 or other storage medium may associated with the processor 514 to store instructions or code executable by the processor. Additionally, an optional frequency error check unit 516 may be employed to perform an additional frequency check as discussed above.

Figure 6:
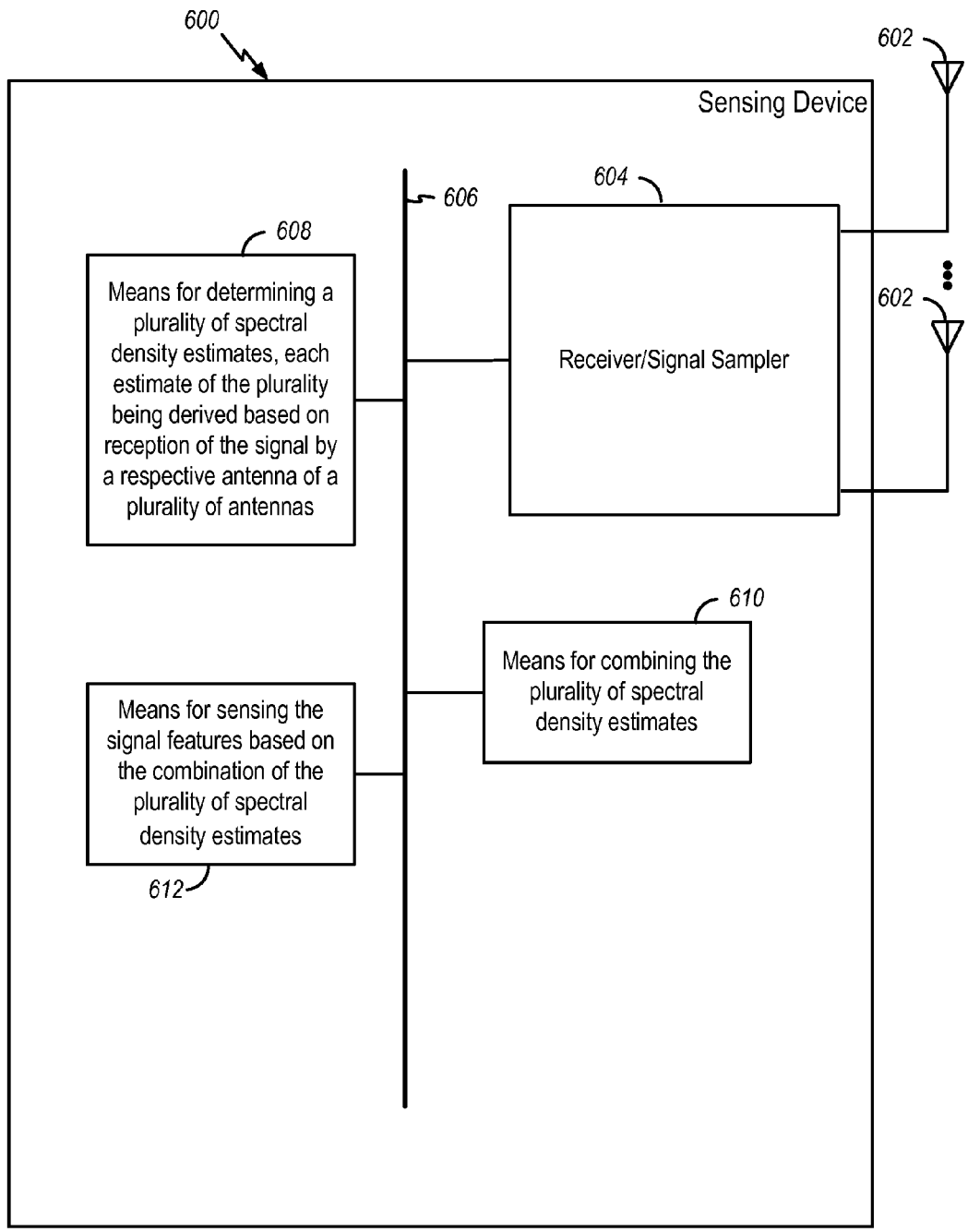
FIG. 6 illustrates another exemplary wireless device that may be used in the system of FIG. 1, for example.

FIG. 6 illustrates another exemplary apparatus 600 that may be used in a receiver portion of a user equipment, base station, test unit, or other wireless device for sensing narrowband signal features in a network, such as cognitive radio networks. Device 60 includes multiple antennas 602 and RF/sampling unit(s) 604 to provide samples of signals received on antennas 602. A communication bus or coupling 606 is shown to illustrate in a general sense communication of data or information between the various means or modules of apparatus 600.

The signal samples are provided to a means 608 for determining a plurality of spectral density estimates, each estimate of the plurality being derived based on reception of the signal by a respective antenna of a plurality of antennas 602. Means 608 may be configured to implement the processes in block 302 of FIG. 3, as an example. Also includes is means 610 for combining the plurality of spectral density estimates (e.g., PSDs) determined by means 608. Means 608 may be configured to carry out the processes of block 304 in FIG. 3, as one example. Finally, apparatus 600 includes means 612 for sensing the signal features based on the combination of the plurality of spectral density estimates as determined by means 610. Means 610 may be configured to implements the various processes in block 306 in FIG. 3, as one example.

In light of the foregoing discussion, one skilled in the art will appreciate that the presently disclosed apparatus and methods engender spectrum sensing that mitigates the deleterious effects of Rayleigh fading through the use of multiple sensing antennas (i.e., spatial diversity). It is noted, in particular, that when the PSD estimates are combined from multiple antennas the sensing performance improves significantly, with performance improving significantly with 2 or more sensing antennae. In fact, with a system using four (4) sensing antennas, it has been proven via system simulation that a decrease in SNR of approximately −20 dB with a four antenna sensing system over a single antenna system yields the same sensing reliability, thus giving the multiple antenna system a roughly 20 dB advantage over the single antenna sensing system.

It is understood that the specific order or hierarchy of steps in the processes disclosed is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The word "exemplary" is used herein to mean "serving as an example, instance, or illustration." Any example described herein as "exemplary" is not necessarily to be construed as preferred or advantageous over other examples.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for sensing features of a signal in a wireless communication system, the method comprising:
   determining a plurality of spectral density estimates, each estimate of the plurality being derived based on reception of the signal by a respective antenna of a plurality of antennas;
   combining the plurality of spectral density estimates; and
   sensing the signal features based on the combination of the plurality of spectral density estimates.

2. The method as defined in claim 1, wherein combining the plurality of spectral density estimates comprises one of averaging the plurality of spectral density estimates and selecting point-wise maxima for each index of the plurality of spectral density estimates.

3. The method as defined in claim 1, wherein determining the plurality of spectral density estimates further comprises:
   digitally sampling signals received on each respective antenna; and
   calculating the respective power spectral density for each of the signals sampled from each respective antenna.

4. The method as defined in claim 1, wherein sensing the signal features further comprises determining a test statistic and comparing the test statistic with a predetermined threshold to determine sensing of the signal features.

5. The method as defined in claim 4, wherein determining the test statistic includes one of determining the largest value of the combined spectral density estimate and determining a normalized value of a strongest value of the combined spectral density estimate.

6. The method as defined in claim 1, further comprising checking the frequency error, and determining that the signal features are not present when the frequency error is above a threshold.

7. The method as defined in claim 1, wherein the signal features include a pilot of at least one of an Advanced Television Systems Committee (ATSC) signal and an NTSC signal.

8. The method as defined in claim 1, wherein the signal features include a wireless microphone signal.

9. The method as defined in claim 1, wherein sensing the presence of the signal features is implemented in a cognitive radio system.

10. An apparatus operable for sensing features of a signal in a wireless communication system, the apparatus comprising:
- a memory storing instructions executable by a processor; and
- at least one processor configured to execute the instructions stored in the memory to:
  - determine a plurality of spectral density estimates, each estimate of the plurality being derived based on reception of the signal by a respective antenna of a plurality of antennas;
  - combine the plurality of spectral density estimates; and
  - sense the signal features based on the combination of the plurality of spectral density estimates.

11. The apparatus as defined in claim 10, wherein combining the plurality of spectral density estimates comprises one of averaging the plurality of spectral density estimates and selecting point-wise maxima for each index of the plurality of spectral density estimates.

12. The apparatus as defined in claim 10, wherein when determining the plurality of spectral density estimates the at least one processor is further configured to execute the instructions stored in the memory to:
- digitally sample signals received on each respective antenna; and
- calculate the respective power spectral density for each of the signals sampled from each respective antenna.

13. The apparatus as defined in claim 10, wherein when sensing the signal features the at least one processor is further configured to execute the instructions stored in the memory to:
- determine a test statistic and comparing the test statistic with a predetermined threshold to determine sensing of the signal features.

14. The apparatus as defined in claim 13, wherein when determining the test statistic the at least one processor is further configured to execute the instructions stored in the memory to:
- one of determine the largest value of the combined spectral density estimate and determine a normalized value of a strongest value of the combined spectral density estimate.

15. The apparatus as defined in claim 10, wherein the at least one processor is further configured to execute the instructions stored in the memory to:
- check the frequency error, and
- determine that the signal features are not present when the frequency error is above a threshold.

16. The apparatus as defined in claim 10, wherein the signal features include a pilot of at least one of an Advanced Television Systems Committee (ATSC) signal and an NTSC signal.

17. The apparatus as defined in claim 10, wherein the signal features include a wireless microphone signal.

18. The apparatus as defined in claim 10, wherein the apparatus is operable in a cognitive radio system.

19. An apparatus operable for sensing features of a signal in a wireless communication system, the apparatus comprising:
- means for determining a plurality of spectral density estimates, each estimate of the plurality being derived based on reception of the signal by a respective antenna of a plurality of antennas;
- means for combining the plurality of spectral density estimates; and
- means for sensing the signal features based on the combination of the plurality of spectral density estimates.

20. The apparatus as defined in claim 19, wherein the means for combining the plurality of spectral density estimates is further configured to one of average the plurality of spectral density estimates and select point-wise maxima for each index of the plurality of spectral density estimates.

21. The apparatus as defined in claim 19, wherein the means for determining the plurality of spectral density estimates further comprises:
- means for digitally sampling signals received on each respective antenna; and
- means for calculating the respective power spectral density for each of the signals sampled from each respective antenna.

22. The apparatus as defined in claim 19, wherein the means for sensing the signal features further comprises means for determining a test statistic and means for comparing the test statistic with a predetermined threshold to determine sensing of the signal features.

23. The apparatus as defined in claim 22, wherein the means for determining the test statistic includes one of means for determining the largest value of the combined spectral density estimate and means for determining a normalized value of a strongest value of the combined spectral density estimate.

24. The apparatus as defined in claim 19, further comprising:
- means for checking the frequency error, and
- means for determining that the signal features are not present when the frequency error is above a threshold.

25. The apparatus as defined in claim 19, wherein the signal features include a pilot of at least one of an Advanced Television Systems Committee (ATSC) signal and an NTSC signal.

26. The apparatus as defined in claim 19, wherein the signal features include a wireless microphone signal.

27. The apparatus as defined in claim 19, wherein the apparatus is operable in a cognitive radio system.

28. A computer program product comprising:
- a non-transitory computer-readable medium comprising:
  - code for causing a computer to determine a plurality of spectral density estimates in a wireless device, each estimate of the plurality being derived based on reception of the signal by a respective antenna of a plurality of antennas;
  - code for causing a computer to combine the plurality of spectral density estimates; and
  - code for causing a computer to sense the signal features based on the combination of the plurality of spectral density estimates.

29. The computer program product as defined in claim 28, wherein the code for causing a computer to combine the plurality of spectral density estimates further comprises one of:
- code for causing a computer to average the plurality of spectral density estimates and;
- code for causing a computer to select point-wise maxima for each index of the plurality of spectral density estimates.

30. The computer program product as defined in claim 28, wherein the code for causing a computer to determine the plurality of spectral density estimates further comprises:
- code for causing a computer to digitally sample signals received on each respective antenna; and
- code for causing a computer to calculate the respective power spectral density for each of the signals sampled from each respective antenna.

31. The computer program product as defined in claim 28, wherein the code for causing a computer to sense the signal features further comprises:

code for causing a computer to determine a test statistic; and code for causing a computer to compare the test statistic with a predetermined threshold to determine sensing of the signal features.

32. The computer program product as defined in claim 31, wherein the code for causing a computer to determine the test statistic includes one of code for causing a computer to determine the largest value of the combined spectral density estimate; and code for causing a computer to determine a normalized value of a strongest value of the combined spectral density estimate.

33. The computer program product as defined in claim 28, further comprising:

code for causing a computer to check the frequency error, and code for causing a computer to determine that the signal features are not present when the frequency error is above a threshold.

34. The computer program product as defined in claim 28, wherein the signal features include a pilot of at least one of an Advanced Television Systems Committee (ATSC) signal and an NTSC signal.

35. The computer program product as defined in claim 28, wherein the signal features include a wireless microphone signal.

36. The computer program product as defined in claim 28, wherein the wireless device is operable in a cognitive radio system.

* * * * *